United States Patent [19]

Balmer et al.

[11] Patent Number: 5,712,032
[45] Date of Patent: Jan. 27, 1998

[54] PATTERNED HEAT WELDING ROD FOR SEAMING RESILIENT FLOORING

[75] Inventors: Richard H. Balmer, Manheim; Donald L. Kurtz, Lititz, both of Pa.

[73] Assignee: Armstrong World Industries, Inc., Lancaster, Pa.

[21] Appl. No.: 561,102

[22] Filed: Nov. 21, 1995

[51] Int. Cl.$^6$ .................................................. D02G 3/00
[52] U.S. Cl. ........................... 428/364; 428/375; 428/394; 428/195; 428/904.4; 428/908.8; 156/304.1; 156/304.3; 156/304.6; 52/389; 52/390
[58] Field of Search .................................. 428/364, 373, 428/375, 394, 400, 203, 204, 161, 163, 480, 483, 518, 195, 904.4, 542.2, 908.8; 156/304.1, 304.3, 304.6; 52/389, 390

[56] References Cited

U.S. PATENT DOCUMENTS 2,839,441  6/1958  Kent .
3,421,277  1/1969  Frischmuth .
3,839,126  10/1974 Haller .
5,635,266  6/1997  Quinn et al. .

FOREIGN PATENT DOCUMENTS 0635582  1/1995  European Pat. Off. .
989058   9/1951  France .
2283937  5/1995  United Kingdom .

Primary Examiner—Patrick Ryan
Assistant Examiner—J. M. Gray

[57] ABSTRACT

The welding rod is a laminate structure in which a print layer is disposed between a first thermoplastic layer and a second transparent thermoplastic layer. Preferably the welding rod is in the form of an elongated element having a half-round cross-sectional shape. The welding rod is used to join two pieces of thermoplastic sheeting, particularly flooring, together. If the welding rod has a pattern similar to the printed pattern of the sheeting the resulting surface covering looks seamless.

12 Claims, 1 Drawing Sheet

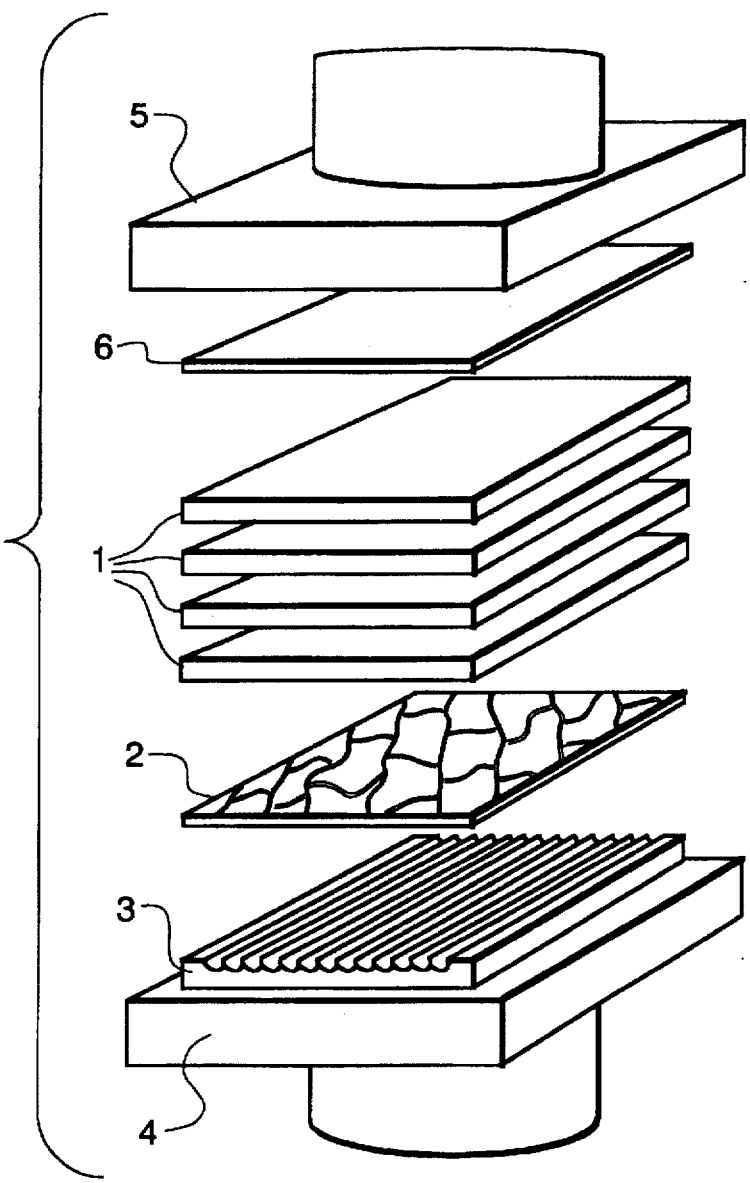
Fig. 1
Fig. 2
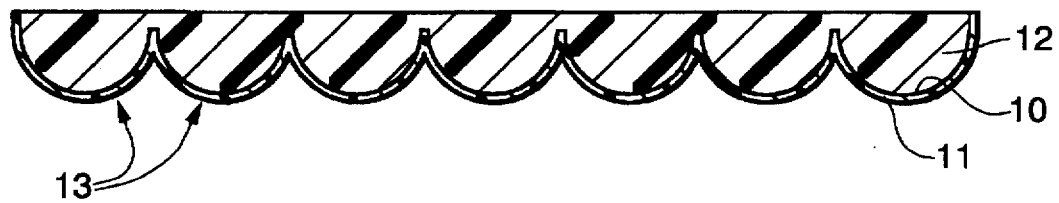

PATTERNED HEAT WELDING ROD FOR SEAMING RESILIENT FLOORING

FIELD OF THE INVENTION

This invention relates to a thermoplastic welding rod used to join two pieces of thermoplastic sheeting, particularly flooring, together. More specifically, a patterned welding rod is prepared that, when welded between two pieces of similarly patterned polyvinyl chloride resilient sheet flooring, disguises the joined area and forms a water-tight, sealed assembly. The pattern may be any multicolored design or image, including wood grain, marble or fanciful. The welding rod is preferably directed to use with resilient floor covering sheets which have a transparent wear layer of significant thickness, and more particularly to laminated floor covering sheets.

BACKGROUND OF THE INVENTION

It has been very desirable to achieve new and unique visuals in floor covering products, and many end-users find it desirable to heat weld flooring seams in an effort to prevent dirt and bacteria from entering the seams. One such method has been to heat weld seams with a solid-colored welding rod. This has become a popular practice in the healthcare industry where sanitation requirements are extremely important.

Not only have flooring manufacturers provided welding rods for seam sealing, but many wall systems are also being marketed with seam welding or seam sealing materials. The end users and job specifiers also often employ seam welding rods as an option to offer a decorative styling element to the specified job. They can add a solid colored welding rod that compliments the color of the patterned floor, or they can use an "accent" color that contrasts sharply with the floor to create a bold new look.

Only recently, however, has a manufacturer offered a non-solid, colored heat welding rod. The welding rod is a through-colored, patterned welding rod which matches the color and design of the floor covering pattern. This heat welding rod uses methods which create a through-color visual which extends all the way from the surface down through the entire depth of the composition in an uninterrupted fashion. The pattern is limited to a multi-colored, chip- or granule-image. Prior to the present invention, a welding rod having a distinct, repeatable pattern has not been produced.

The use of an extruded, solid colored or clear, polyvinyl chloride, round cross-section welding rod is well known in the art to join two pieces of vinyl resilient flooring together. This prior art process uses an unfilled, highly plasticized, colored polyvinyl chloride formulation that is in turn extruded through a round die to form a round cross-section, flexible, easily cut rod for seam sealing.

Extrusion yields a solid color rod or, in some cases in which there are shade variations, a swivel effect such as a barber pole results. In no instance is a distinct sharp edge design obtained. The solid color rod areas appear as a seam of solid contrasting color at every welded installation site creating a discontinuity in the flooring surface. This disrupts the flooring pattern image. The desire for a single image flooring or a flooring surface wider than the width of the flooring product, but having a continuous image has been expressed by many designers and architects. No known welding rod containing a distinct pattern is known.

SUMMARY OF THE INVENTION

The welding rod of the present invention can be produced by laminating a 6-mil printed, calendered PVC film to several overlying layers of 20-mil clear calendered films. The print image which matches the floor covering design is printed by any conventional means and could be done in a way that would create a realistic image. Lithographic printing and rotogravure printing techniques were found to be satisfactory. In fact, some printed film from a vendor was purchased for use in a flooring structure, and then, the same film was used to make a welding rod to match the flooring structure.

The welding rod thickness is preferably 80 to 90 mils. The final structure was a sandwich-type structure. The bottom layer was a 6-mil printed film. To this print image layer, four successive layers of 20-mil clear calendered PVC films were laminated. The lamination could be done in either a hot/cold press type of operation or one could employ other methods. Multiple film liaminations were produced simultaneously on an Auma machine. Also, two films were laminated using a regular calendar/laminator on a roll press consolidation line. In any case, once the films have been laminated, they are die-cut into pieces/sheets that could be placed into a hot/cold press and molded into the half-round configuration of the final product welding rod.

Subsequent testing revealed that the product had adequate bond strength. Naturally, the conditions and test results would vary if one opted to use different chemical compositions for the product/process structure.

One object of the present invention is to make a finished surface covering installation which looks seamless.

Another object of the present invention is to create a welding rod having a pattern similar to the printed pattern of the surface covering to which it is to be welded.

A further object is to produce such a welding rod with an easy and controllable process.

The objects are met by printing a desired image on one layer of film and laminating successive layers of clear films to create the same unique visual as the surface covering. Gauge variation can be minimized by using calendered films. The calendered films are then preferably molded into half-round cross-sectional welding rods.

In the preferred embodiment, the printed image is protected by at, least 30 mils of clear film, i.e., PVC or otherwise. Thus, as the produce surface wears away, the underlying print does not change.

BRIEF DESCRIPTION OF THE DRAWINGS

FIG. 1 is a schematic representation of a method to form the welding rod of the present invention.

FIG. 2 is a schematic representation of the present welding rod after being molded and prior to being separated into individual welding rods.

DETAILED DESCRIPTION OF THE INVENTION

In an effort to create a new flooring structure via a lamination process, heat welding rods were produced having a appearance similar to the flooring sheets. Different sandwich type structures were laminated using printed and clear PVC films. Such welding rods are more cost effective and would speed up introduction of surface covering patterns for commercial introduction, because the process merely relies on photographing the image of the surface covering structure to reproduce the visual for the welding rod.

The printed film used to create the new laminated flooring structure were used to produce the patterned weld rod in a separate process. The composition of the laminates are well known in the art. This new process offers a visual that could be readily matched to any pattern and/or design with relative ease. By merely photographing and printing the design, one could laminate the printed film and create a patterned welding rod. Referring to FIG. 1, the preferred method is to laminate several layers of clear film 1 on top of a 6 mil printed film 2 and then pressing them into a molded ½-round weld rod shape configuration.

Alternatively, the lamination was done on a flat-bed press. All of the films were "pinned" (or perforated) to allow entrapped air to be released. A 6 mil printed polyvinyl chloride (PVC) base film was placed on the bottom press platen with the printed surface up and with a cork pad and three pieces of duct cloth disposed between the platen and the base film. Four 20 mil clear films were placed over the printed base film, followed by a top release paper or felt.

The layers were pressed for one-half minute at 8 psi and then for one half minute at 80 psi. The temperature of the top and bottom platens was 300° F. The laminate was then cooled for 3 minutes under the 80 psi pressure.

The laminated sheet was pressed into welding rods by placing a half-round embossing mold 3 on the bottom press platen 4, stripping the release paper/felt from the laminate and placing it onto the mold. The bottom platen was then pre-heated for 2 minutes to 325° F. The top press platen 5 was then lowered onto the laminate with a top release paper, release felt or ferro-chrome plate 6 disposed between the top platen and the laminate. The laminate was pressed for one and a half minutes at 4 psi and cooled for 3 minutes under the 4 psi pressure.

The laminates were placed onto the mold with the backside of the printed film against the cutting edges of the mold. Thus, after pressing, the print image was facing upward as shown in FIG. 2. The print layer 10 is disposed between the film 11 on which the print layer is adhered, and the calendered clear film 12. The individual welding rods 13 are then separated. The structure of the welding rods 13 do not resemble the homogeneous, round weld rods or the uniformly distributed chip, half-round weld rods of the prior art.

The product could also be made by multiple film laminations, using a continuous process to laminate the various layers. As such, either the films could be pre-heated and laminated to a heated/warm substrate, or one could pre-heat a substrate and then wrap the films around a cold laminator roll to consolidate the two layers. The technique depends on the thickness of the films being used, as well as their chemical composition.

To minimize plasticizer migration, the welding rod formulation, especially the plasticizer system, must be balanced with the surface covering formulation. The plasticizer content and type should be similar between the welding rod and surface covering.

Flooring is typically installed at temperatures between 55° F. to 85° F. Therefore, flexibility and ease of cutting must be maintained even near the lower end of the range. This is done by the addition of a low temperature plasticizer such as dioctcyl adipate. Preferably the glass transition temperature, $T_g$, of the plasticized chips is no greater than 30° F., more preferably no greater than 25° F., and most preferably no greater than 22° F.

Thermoplastic materials which can be used to make the thermoplastic welding rods include polyvinyl chloride, acrylonitrile/butadiene/styrene, polypropylene, polyethylene, and thermoplastic polyurethane. Other thermoplastic resins that can be plasticized and used include polyvinyl acetate, cellulose acetate, polystyrene, ethyl cellulose, polyvinylidene chloride, polyurethane, nylon, acrylic, and polyphenylene oxide. The following thermoplastic resins have been used to make welding rods of the present invention: polyvinyl chloride homopolymers and copolymers with acetate functionality, and mixtures thereof. Polyvinyl chloride homopolymers are preferred.

Plasticizers which can be used include butyl cyclohexyl phthalate, tri(butoxyethyl) phosphate, trioctyl phosphate, 2-ethylhexyl diphenyl phosphate, dibutyl phthalate, diisobutyl adipate, epoxidized di(2-ethylhexyl) tetrahydrophthalate, di(2-ethylhexyl) phthalate, diisooctyl phthalate, dioctyl adipate, diisononyl phthalate, di(2-ethylhexyl) hexahydrophthalate, n-octyl,n-decyl phthaiate, tricresyl phosphate, butyl benzyl phthalate, dicapryl phthalate, di(3,5,5-trimethylhexyl) phthalate, diisodecyl phthalate, di(2-ethylhexyl) adipate, butyl epoxy stearate, epoxidized soya oil, epoxidized octyl tallate, dimethyl phthalate, hexyl epoxy stearate, cresyl diphenyl phosphate, di(2-ethylhexyl isophthalate, n-octyl,n-decyl adipate, di(2-ethylhexyl) azelate, epoxidized octyl oleate, di(2-ethylhexyl) sebacate, tetraethylene glycol/di(2-ethyhexoate), diisodecyl adipate, and triethylene glycol/di(2-ethylhexoate). Total plasticizer concentration should be between 35 and 60 phr, preferably between 40 and 55 phr, and most preferably between 45 and 50 phr. Combinations of plasticizers are preferred.

We claim:

1. A thermoplastic welding rod consisting essentially of a first thermoplastic layer, a second transparent thermoplastic layer and a print layer disposed between the first and second layers.

2. The welding rod of claim 1 wherein the welding rod is in the form of an elongated element having a half-round cross-sectional shape.

3. The welding rod of claim 1 wherein the second transparent layer is substantially colorless.

4. The welding rod of claim 1 wherein the rod is formed by splicing a plurality of rods together end-to-end, whereby the layers are substantially continuous.

5. The welding rod of claim 1 wherein the first and second layers comprise a polymer selected from the group consisting of polyvinyl chloride and polyester.

6. A thermoplastic welding rod comprising a first thermoplastic layer, a second transparent thermoplastic layers and a print layer disposed between the first and second layers, the second layer having a substantially flat surface and an opposed convex surface whereby the thickness of the first layer is not substantially uniform.

7. The welding rod of claim 6 wherein the print layer follows the contour of the opposed convex surface and is adhered to the opposed convex surface.

8. The welding rod of claim 6 wherein the welding rod is in the form of an elongated element having a half-round cross-sectional shape.

9. The welding rod of claim 6 wherein the second transparent layer is substantially colorless.

10. The welding rod of claim 6 wherein the rod is formed by splicing a plurality of rods together end-to-end, whereby the layers are substantially continuous.

11. The welding rod of claim 6 wherein the first and second layers comprise a polymer selected from the group consisting of polyvinyl chloride or polyester.

12. The welding rod of claim 6 wherein a plurality of transparent thermoplastic layers overly the printed layer.

* * * * *